US006195608B1

(12) United States Patent
Berliner et al.

(10) Patent No.: US 6,195,608 B1
(45) Date of Patent: Feb. 27, 2001

(54) ACOUSTIC HIGHWAY MONITOR

(75) Inventors: Edward Fredrick Berliner, Randolph, NJ (US); John Patrick Kuhn, Woodbridge, VA (US); Scott Andrew Rawson, Fairfax, VA (US); Anthony Donald Whalen, Rockaway, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/074,563

(22) Filed: May 7, 1998

(Under 37 CFR 1.47)

Related U.S. Application Data

(63) Continuation-in-part of application No. 08/069,957, filed on May 28, 1993, now Pat. No. 6,021,364.

(51) Int. Cl.[7] ..................................................... B60Q 5/00
(52) U.S. Cl. ........................................... 701/118; 340/943
(58) Field of Search ............................... 701/1, 117, 118, 701/119; 346/934, 935, 943; 367/135; 73/645, 646

(56) References Cited

U.S. PATENT DOCUMENTS

| | | | |
|---|---|---|---|
| 3,047,838 | 7/1962 | Hendricks | 364/437 |
| 3,233,084 | 2/1966 | Kendall et al. | 364/437 |
| 3,397,304 | 8/1968 | Auer, Jr. | 364/437 |
| 3,445,637 | 5/1969 | Auer, Jr. | 364/437 |
| 4,163,283 | 7/1979 | Darby | 364/439 |
| 4,789,941 | 12/1988 | Nunberg | 364/436 |
| 5,060,206 | 10/1991 | DeMetz, Sr. | 367/136 |
| 5,250,946 | 10/1993 | Stanzcyk | 364/437 |
| 5,878,367 * | 3/1999 | Lee et al. | 701/118 |
| 5,889,477 * | 3/1999 | Fastenrath | 701/118 |
| 6,021,364 * | 2/2000 | Berliner et al. | 701/1 |

* cited by examiner

*Primary Examiner*—Gary Chin
(74) *Attorney, Agent, or Firm*—Martin I. Finston

(57) ABSTRACT

Apparatus and method are provided for detecting vehicles which are moving through a predetermined zone. The apparatus includes a plurality of acousto-electric transducers trained on the zone. A bandpass filter is provided for processing electrical signals from the plurality of acousto-electric transducers. A correlator having at least two inputs and an output is provided for correlating filtered versions of the electrical signals originating from at least two of the plurality of acousto-electric transducers. An integrator is provided for integrating the output of the correlator means over time. Finally, a comparator is provided for indicating detection of a vehicle when the integrated output exceeds a predetermined threshold.

12 Claims, 5 Drawing Sheets

ACOUSTIC HIGHWAY MONITOR

CROSS-REFERENCE TO RELATED APPLICATIONS

This invention is a continuation-in-part of application Ser. No. 08/069,957, filed May 28, 1993, now U.S. Pat. No. 6,021,364, the entire contents of which are incorporated herein by reference.

FIELD OF THE INVENTION

The present invention relates to highway monitoring systems in general and, more specifically, to systems which detect and signal the existence of a motor vehicle within a predetermined detection zone on the roadway.

BACKGROUND OF THE INVENTION

Highway departments use a variety of techniques to monitor traffic in an effort to detect, mitigate, and prevent congestion. Typically, each highway department has a command center that receives and integrates a plurality of signals which are transmitted by monitoring systems located along the highway. Although different kinds of monitoring systems are used, the most prevalent system employs a roadway metal detector. In such system, a wire loop is embedded in the roadway and its terminals are connected to detection circuitry that measures the inductance changes in the wire loop. Because the inductance in the wire loop is perturbed by a motor vehicle (comprising a quantity of ferromagnetic material) passing over it, the detection circuitry can detect when a motor vehicle is over the wire loop. Based on this perturbation, the detection circuitry creates a binary signal, called a "loop relay signal," which is transmitted to the command center of the highway department. The command center gathers the respective loop relay signals and from there makes a determination as to the likelihood of congestion. The use of wire loops is, however, disadvantageous for several reasons.

First, a wire loop system will not detect a motor vehicle unless the motor vehicle comprises a sufficient ferromagnetic material to create a noticeable perturbation in the inductance in the wire loop. Because the trend is to fabricate motor vehicles with non-ferromagnetic alloys, plastics and composite materials, wire loop systems will increasingly fail to detect the presence of motor vehicles. It is already well known that wire loops often overlook small vehicles. Another disadvantage of wire loop systems is that they are expensive to install and maintain. Installation and repair require that a lane be closed, that the roadway be cut and that the cut be sealed. Often too, harsh weather can preclude this operation for several months.

Other non-invasive systems have been suggested. U.S. Pat. No. 5,060,206, patented Oct. 22, 1991, by F. C. de Metz, Sr., entitled "Marine Acoustic Aerobuoy and Method of Operation," provided a marine acoustic detector for use in identifying a characteristic airborne sound pressure field generated by a propeller-driven aircraft. The detector included a surface-buoyed resonator chamber which was tuned to the narrow frequency band of the airborne sound pressure field and which had a dimensioned opening formed into a first endplate of the chamber for admitting the airborne sound pressure field. Mounted within the resonator chamber was a transducer circuit comprising a microphone and a preamplifier. The microphone functioned to detect the resonating sound pressure field within the chamber and to convert the resonating sound waves into an electrical signal.

The preamplifier functioned to amplify the electrical signal for transmission via a cable to an underwater or surface marine vehicle to undergo signal processing. The sound amplification properties of the resonator air chamber were exploited in the passive detection of propeller-driven aircraft at airborne ranges exceeding those ranges of visual or sonar detection to provide 44 dB of received sound amplification at common aircraft frequencies below 100 Hz. However, this patent used only a single electro-acoustic transducer for receiving acoustic signals within a detection zone, and did not teach spatial discrimination circuitry for representing acoustic energy emanating from a detection zone.

U.S. Pat. No. 3,445,637, patented May 20, 1969, by J. M. Auer, Jr., entitled "Apparatus For Measuring Traffic Density" provided apparatus for measuring traffic density in which a sonic detector produced a discrete signal which was inversely proportional only to vehicle speed for each passing vehicle. A meter, which was responsive to the discrete signals, produced a measurement representative of traffic density. However, this patent used only a single electro-acoustic transducer for receiving acoustic signals within a detection zone, and did not teach spatial discrimination circuitry for representing acoustic energy emanating from a detection zone.

U.S. Pat. No. 3,047,838, patented Jul. 31, 1962, by G. D. Hendricks, entitled "Traffic Cycle Length Selector" provided a traffic cycle length selector which automatically related the duration of a traffic signal cycle to the volume of traffic in the direction of heavier traffic along a throughfare. The Hendricks system did not teach the use of electro-acoustic transducers, but instead used pressure-sensitive detectors. While Hendricks employed plural, non-electro-acoustic transducers, the traffic cycle length selector system did not include spatial discrimination circuitry. Hendricks merely described the use of the output of several spatially discriminate detectors to generate a spatially indiscriminate signal.

SUMMARY OF THE INVENTION

Aims of the Invention

One object of the present invention is to provide apparatus and method to monitor highway traffic while avoiding many of the costs and restrictions associated with prior techniques.

Another object of the present invention is to provide such apparatus which can be installed and maintained in any weather and which does not require that the roadway be closed, torn-up or repaved.

Statements of Invention

The present invention provides apparatus for detecting vehicles moving through a predetermined zone, comprising: (a) a plurality of acousto-electric transducers trained on that zone; (b) bandpass filtering means for processing electrical signals from the plurality of acousto-electric transducers; (c) correlator means having at least two inputs and an output for correlating filtered versions of the electrical signals originating from at least two of the plurality of acousto-electric transducers; (d) integrator means for integrating the output of the correlator means over time; and (e) comparator means for indicating detection of a vehicle when the integrated output exceeds a predetermined threshold.

The present invention also provides a method for detecting vehicles moving through a predetermined zone, comprising the steps of: (a) training a plurality of acousto-electric transducers on that zone; (b) filtering electrical signals from the plurality acousto-electric transducers; (c) correlating at least two of the filtered electrical signals with one another; (d) integrating the results of correlation in step (c) over time; and (e) comparing the integrated result of step (d) to a predetermined threshold and indicating detection of a vehicle when the threshold is exceeded by the integrated result.

Other Features of the Invention

By one feature of this invention, the apparatus further includes a plurality of analog-to-digital converter means for converting said electrical signals to digital representations prior to the processing thereof.

By a further feature of this invention, the integrator and the comparator means are each microprocessor-based programs.

By still another feature of this invention, the plurality of acousto-electric transducers comprises two vertical and two horizontal multiple-microphone elements, and the correlator means has one of the at least two inputs receiving a sum of the two multiple-microphone vertical elements, and the other of the at least two inputs receiving a sum of the two horizontal multiple-microphone elements.

By one feature of the method of this invention, the method further includes the step of converting said electrical signals to digital representations prior to said filtering. By a feature of such feature, the steps of integrating and comparing are each computational routines.

By another feature of the method of this invention, the plurality of acousto-electric transducers comprises two vertical and two horizontal multiple-microphone elements, and the correlating step continuously correlates the sum of the two vertical multiple-microphone elements with sums of the two horizontal multiple-microphone elements.

DESCRIPTION OF PREFERRED EMBODIMENT

Each motor vehicle using a highway radiates acoustic energy from the power plant (e.g., the engine block, pumps, fans, belts, etc.) and from its motion along the roadway (e.g., tire noise due to friction, wind flow noise, etc.). While the energy fills the frequency band from DC up to approximately 16 KHz, there is a reliable presence of energy from about 3 KHz to about 8 KHz. Embodiments of the present invention exploit this observation for the purpose of highway surveillance.

Figure 1:
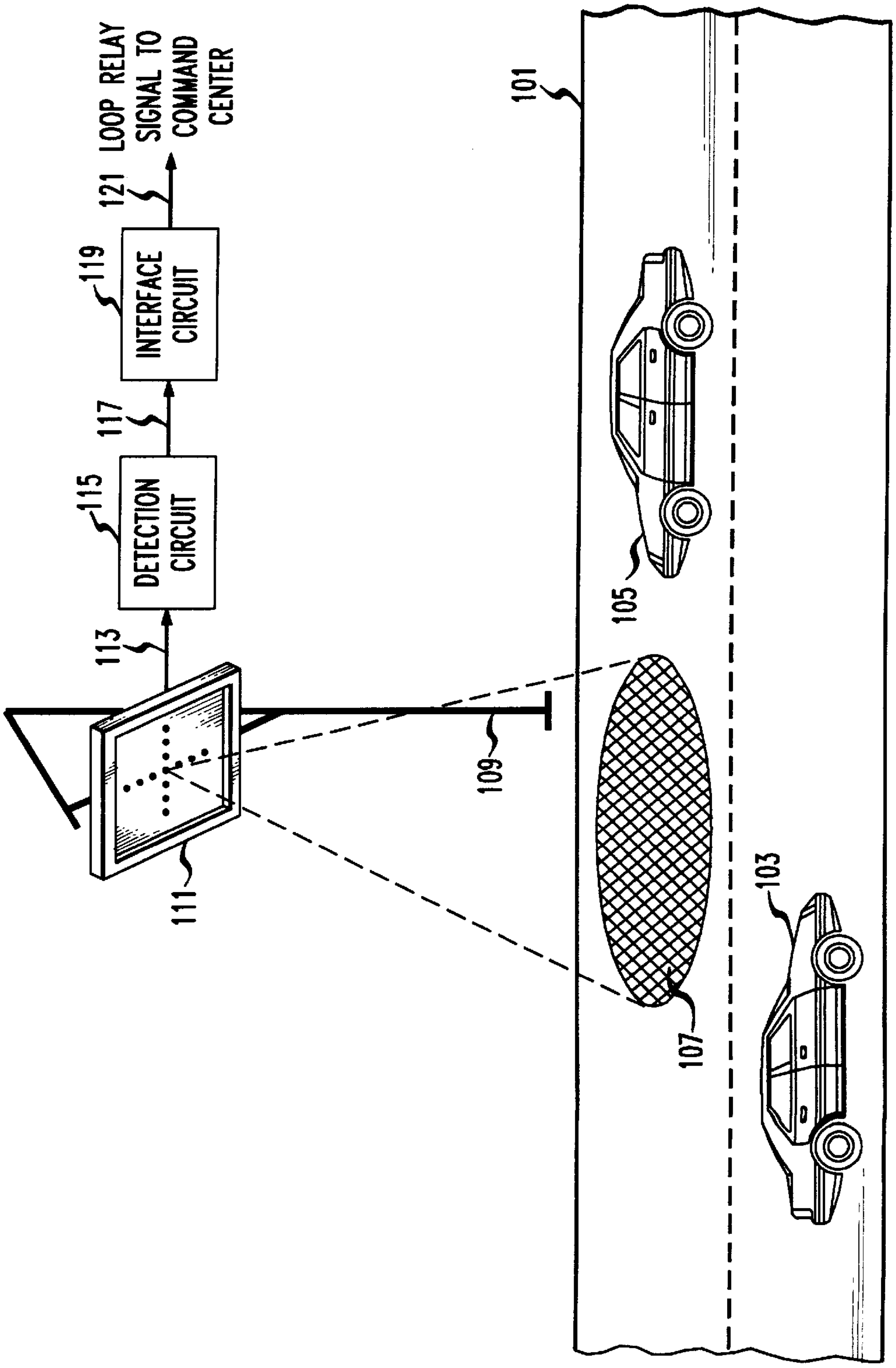
FIG. 1 is a drawing of an illustrative embodiment of the present invention as it is used to monitor the presence or absence of a motor vehicle in a predetermined detection zone.

Description of FIG. 1

FIG. 1 depicts an illustrative embodiment of the present invention that monitors a predetermined area of roadway, called a "predetermined detection zone," for the presence of a motor vehicle within that area. The salient items in FIG. 1 are roadway 101, motor vehicle 103, motor vehicle 105, detection zone 107, microphone array 111, microphone support 109, detection circuit 115 and interface circuit 119 in a roadside cabinet (not shown), electrical bus 113, electrical bus 117 and lead 121.

Each omni-directional microphone in microphone array 111 receives an acoustic signal which comprises the sound radiated, inter alia, from motor vehicle 103, motor vehicle 105 and ambient noise. Each microphone in microphone array 111 then transforms its respective acoustic signal into an analog electric signal and outputs the analog electric signal on a distinct lead on electrical bus 113 in ordinary fashion. The respective analog electric signals are then fed into detection circuit 115.

To determine the presence or passage of a motor vehicle in predetermined detection zone 107, the respective signals from microphone array 111 are processed in ordinary fashion to provide the sensory spatial discrimination needed to isolate sounds emanating from within predetermined detection zone 107.The ability to control the spatial directivity of microphone array 111 is called "beam-forming." It will be clear to those skilled in the art that electronically-controlled steerable beams can be used to form multiple detection zones.

Figure 2:
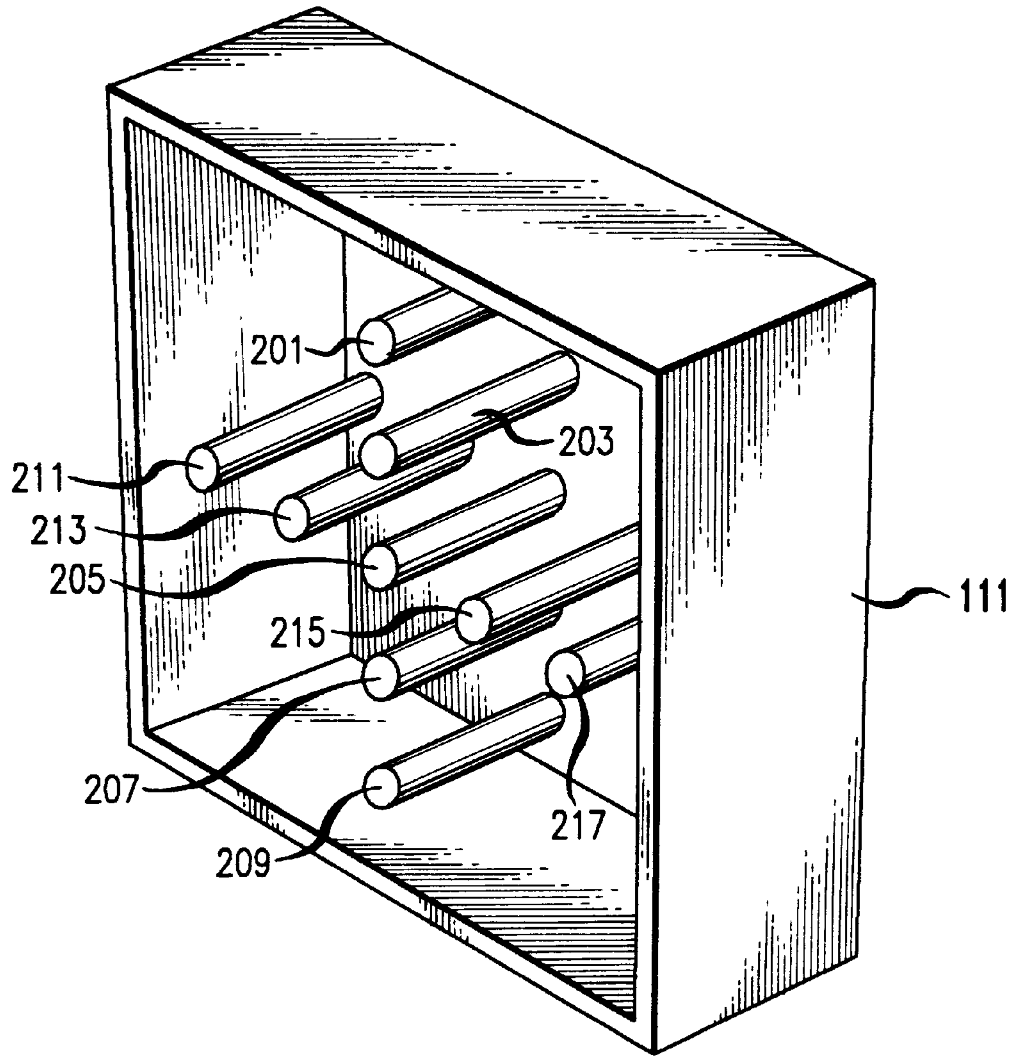
FIG. 2 is a drawing of an illustrative microphone array as can be used in the illustrative embodiment of the present invention.

Description of FIG. 2

As shown in FIG. 2, microphone array 111 preferably comprises a plurality of acoustic transducers (e.g., omnidirectional microphones), arranged in a geometrical arrangement known as a Mill's Cross. For information regarding Mill's Cross arrays, the interested reader is directed to *Microwave Scanning Antenna*, R. C. Hensen, E., Academic Press (1964), and *Principals of Underwater Sound* (3rd. Ed), R. J. Urick (1983). While microphone array 111 could comprise only one microphone, the benefits of multiple microphones (to provide signal gain and directivity, whether in a fully or sparsely populated array or vector), will be clear to those skilled in the art. It will also be clear to those skilled in the art how to baffle microphone array 111 mechanically so as to attenuate sounds coming from other than predetermined detection zone 107 and to protect microphone array 111 from the environment (e.g., rain, snow, wind, UV). Microphone array 111 is advantageously rigidly mounted on support 109 so that the predetermined relative spatial positionings of the individual microphones are maintained. A typical deployment geometry is shown in FIG. 1. For this geometry, the horizontal distance of the sensor from the nearest lane with traffic is assumed to be less than about 15 feet. The vertical height above the road is advantageously between about 20 and about 35 feet, depending on performance requirements and available mounting facilities. It will be clear to those skilled in the art that the deployment geometry is flexible and can be modified for specific objectives. Furthermore, it will also be clear to those skilled in the art how to position and orient microphone array 111 so that it is well suited to receive sounds from predetermined detection zone 107.

Figure 3:
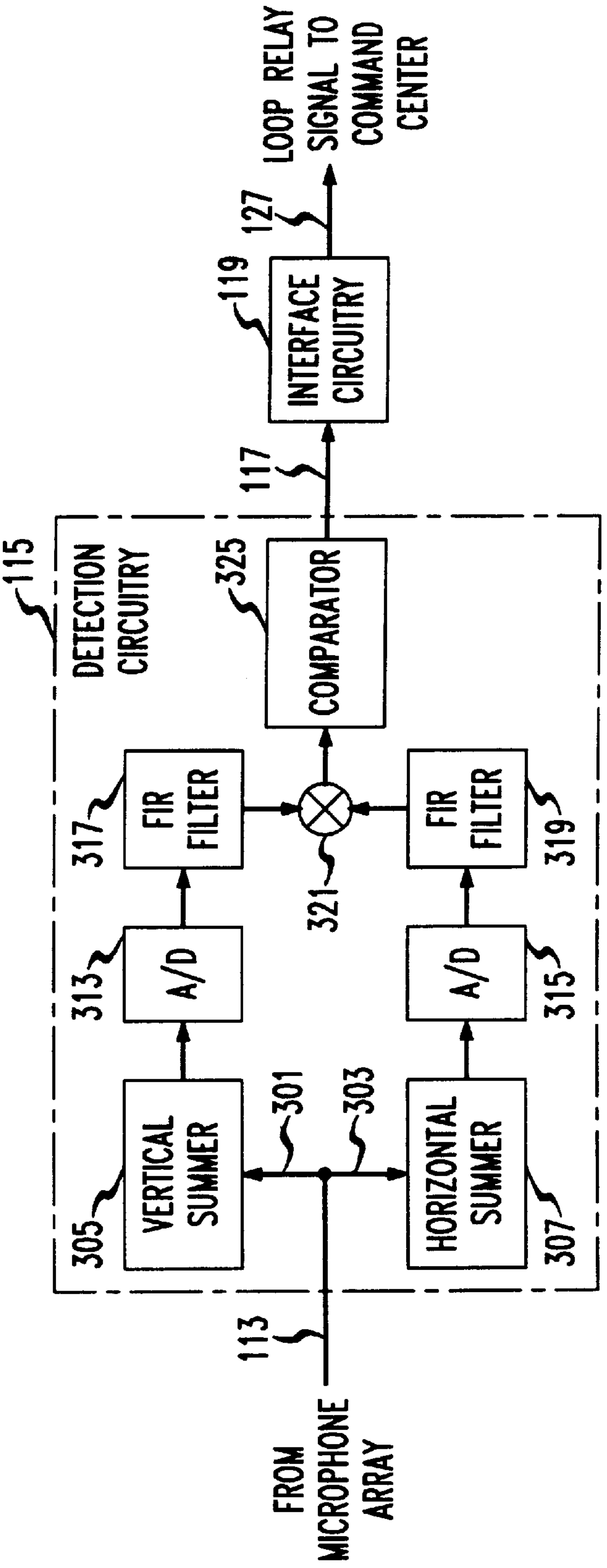
FIG. 3 is a block diagram of the internals of an illustrative detection circuit as shown in FIG. 1.

Description of FIG. 3

Referring to FIG. 3, detection circuit 115 advantageously comprises bus 301, vertical summer 305, analog-to-digital converter 313, finite-impulse-response filter 317, bus 303, horizontal summer 307, analog-to-digital converter 315, finite-impulse-response filter 319, multiplier 321 and comparator 325. The electric signals from microphone 201, microphone 203, microphone 205, microphone 207 and microphone 209 (as shown in FIG. 2) are fed, via bus 301, into vertical summer 305 which adds them in well-known fashion and feeds the sum into analog-to-digital converter 313. While in the illustrative embodiment, vertical summer 305 performs an unweighted addition of the respective signals, it will be clear to those skilled in the art that vertical summer 305 can alternately perform a weighted addition of the respective signals so as to shape and steer the formed beam (i.e., to change the position of predetermined detection zone 107). It will also be clear to those skilled in the art that illustrative embodiments of the present invention can comprise two or more detection circuits, so that one microphone array can gather the data for two or more detection zones, in each lane or in different lanes.

Analog-to-digital converter 313 receives the output of vertical summer 305 and samples it at 32,000 samples per second in well-known fashion. The output of analog-to-digital converter 313 is fed into finite-impulse response filter 317.

Finite-impulse response filter 317 is preferably a bandpass filter with a lower passband edge of 4 KHz, an upper passband edge of 6 KHz and a stopband rejection level of 60 dB below the passband (i.e., stopband levels providing 60 dB of rejection). It will be clear to those skilled in the art how to make and use finite-impulse-response filter 317.

The electric signals from microphone 211, microphone 213, microphone 205, microphone 215, and microphone 217 (as shown in FIG. 2) are fed, via bus 303, into horizontal summer 307 which adds them in well-known fashion and feeds the sum into analog-to-digital converter 315. While in the illustrative embodiments, horizontal summer 307 performs an unweighted addition of the respective signals, it will be clear to those skilled in the art that horizontal summer 307 can alternately perform a weighted addition of the respective signals so as to shape and steer the formed beam (i.e., to change the position of predetermined detection zone 107).

Analog-to-digital converter 315 receives the output of horizontal summer 305, and samples it at 32,000 samples per second in well-known fashion. The output of analog-to-digital converter 313 is fed into finite-impulse response filter 319.

Finite-impulse response filter 319 is preferably a bandpass filter with a lower passband edge of 4 KHz, an upper passband edge of 6 KHz and a stopband rejection level of 60 dB below the passband (i.e., stopband levels providing 60 dB of rejection). It will be clear to those skilled in the art how to make and use finite-impulse-response filter 319.

Multiplier 321 receives, as input, the output of finite-impulse-response filter 317 and finite-response-filter 319 and performs a sample-by-sample multiplication of the respective inputs and then performs a coherent averaging of the respective products. The output of multiplier 321 is fed into comparator 325. It will be clear to those skilled in the art how to make and use multiplier 321.

Comparator 325 advantageously, on a sample-by-sample basis, compares the magnitude of each sample to a predetermined threshold and creates a binary signal which indicates whether a motor vehicle is within predetermined detection zone 107. While the predetermined threshold can be a constant, it will be clear to those skilled in the art that the predetermined threshold can be adaptable to various weather conditions and/or other environmental conditions which can change over time. The output of comparator 325 is fed into interface circuitry 119.

Interface circuitry 119 receives the output of detection circuitry 115 and preferable creates an output signal such that the output signal is asserted when a motor vehicle is within predetermined detection zone 107 and such that the output signal is retracted when there is no motor vehicle within the predetermined detection zone 107. Interface circuitry 119 also makes any electrical conversions necessary to interface to the circuitry at the command center of the highway department. Interface circuitry 119 can also perform statistical analysis on the output of the detection circuitry 115 so as to output a signal which has other characteristics than those described above.

Figure 4:
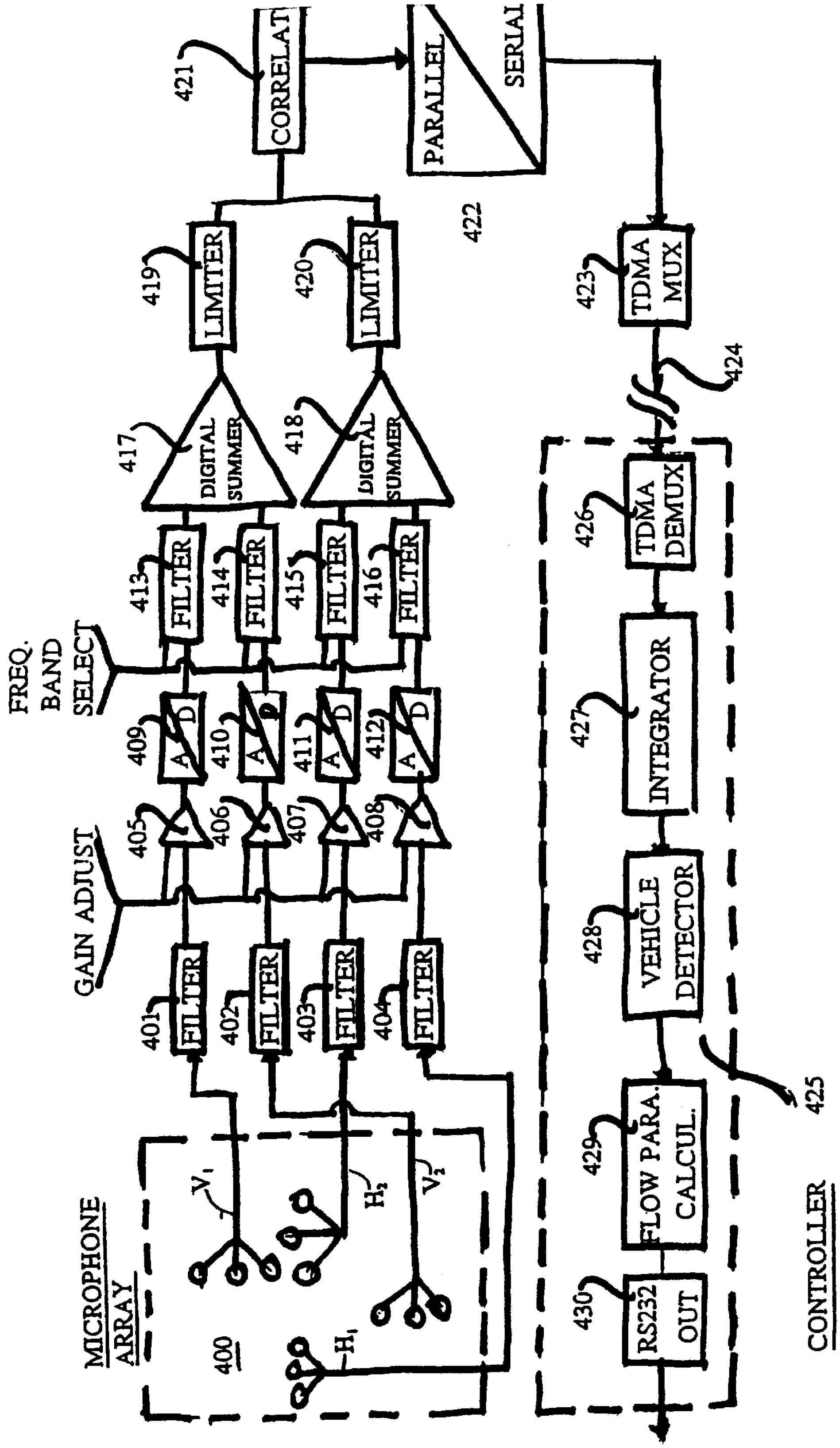
FIG. 4 is a detailed block diagram of a preferred embodiment of the acoustic highway monitor according to the present invention.

Description of FIG. 4

FIG. 4 of the drawings illustrates an exemplary implementation using digital processing components to a great extent. The microphone array 400 comprises two vertical elements $V_1$ and $V_2$, and two horizontal elements $H_1$ and $H_2$. As shown, each element has three microphones. Each of the four elements $V_1$, $V_2$, $H_1$, and $H_2$ feeds a respective analog filter 401–404 to attenuate unwanted noise outside the maximal frequency band of interest, which is normally between about 4 and about 9 kHz. The filters 401–404 are each followed by a selectable gain preamplifier 405–408, the gain of which is selectable in 3-dB steps ranging from 0 dB to 15 dB (hereto to be described more fully later). Four respective analog-to-digital converters 409–412 follow the preamplifiers 405–408. Respective digital finite impulse response (FIR) filters 413–416 follow the A/D converters 409–412. The FIR filters 413–416 determine the actual frequency band of operation, which is selected, e.g., from the following four bands:

Band 1: 4–6 kHz;
Band 2: 5–7 kHz;
Band 3: 6–8 kHz; and
Band 4: 7–9 kHz.

One value for the gain of all the preamplifiers 405–408 will exemplarily be selected for the four above bands as follows:

| Band 1 | Band 2 | Band 3 | Band 4 |
|---|---|---|---|
| 9dB | 11dB | 13dB | 15dB |
| 6dB | 8dB | 10dB | 12dB |
| 3dB | 5dB | 7dB | 9dB |
| 0dB | 2dB | 4dB | 6dB. |

The selection of the frequency band would normally depend on the general nature of the expected vehicle traffic at the particular location of the sensor. The selected gain would depend, in addition, on the distance of the sensor from the road surface. The outputs of the FIR filters 413 and 414 (the paths of $V_1$ and $V_2$) are summed in digital summer 417, while the outputs of the FIR filters 415 and 416 (the paths of $H_1$ and $H_2$) are summed in digital summer 418. The respective digital summers 417 and 418 are followed by digital limiters 419 and 420, respectively, and the outputs of the latter are input to correlator 421, the output of which is fed to a parallel-to-serial converter 422, the serial output of which would normally be fed to a TDMA multiplexer (TDMA-MUX) 423 to be time-division multiplexed with other (conveniently four) processed microphone array signals originating from overhead locations near the array 400. The multiplexed output of TDMA-MUX 423 is then normally relayed by cable 424 to roadside microprocessor-based controller 425, where it is demultiplexed in DEMUX 426 into the original number of serial outputs representing the serial outputs of correlators, e.g., 421. After demultiplexing in DEMUX 426, the cross-correlated digital output from the correlator 421 is intergrated in integrator 427 (which could be a software routine in the microprocessor/controller 425), and, depending on the correlated/integrated signal level, which is compared to a threshold in vehicle detector 428, a “vehicle present” signal is issued for the duration above threshold. This information is processed by a flow parameter calculation routine 429 of the controller 425, the output of which is an RS232 standard in addition to hard-wired vehicle presence circuits or relays (not shown).

Figure 5:
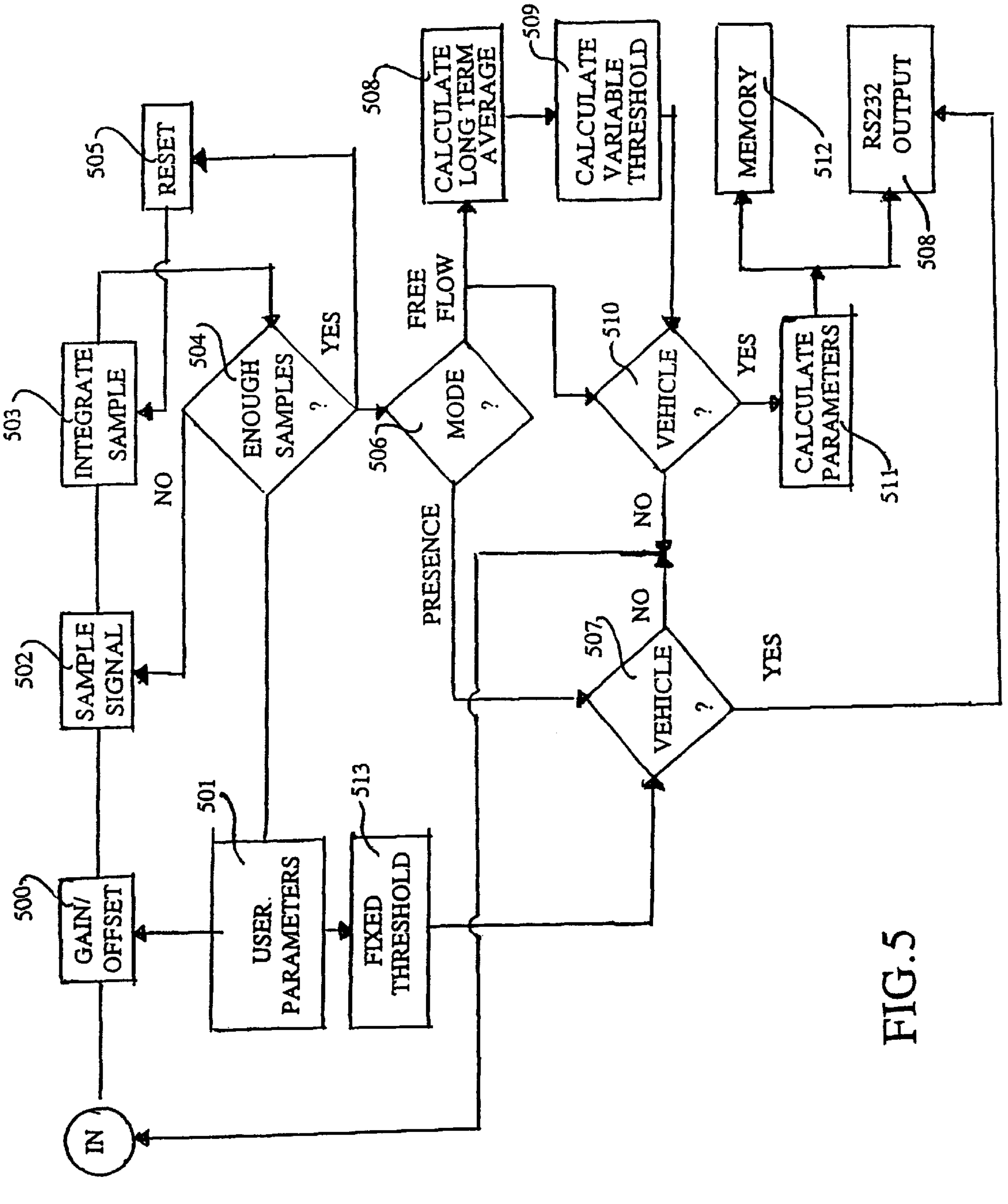
FIG. 5 is a flowchart showing the operation of the controller block shown in FIG. 4.

Description of FIG. 5

The operation of the controller 425, whereby the demultiplexed signal from DEMUX 426 is processed, will be better explained by reference to the flow-chart shown in FIG. 5. The signal is adjusted in gain/offset 500 depending on user specific parameters 501 and then sampled 502 and integrated 503. The signal sampling 503 continues until enough samples 504 have been collected, upon which the integrator 503 is reset 505 and the mode (i.e., whether the controller is used to indicate only vehicle presence or to monitor traffic flow) is determined 506. If the mode is to indicate vehicle presence (for example, to switch a traffic light from red to green), and a vehicle is detected 507, the decision is immediately output 508. If the mode 506 is "free flow," then long-term speed average is calculated 508 from which variable thresholds are progressively calculated 509. That is, the more vehicles there are, the more accurate will the average progressively become. This variable threshold is used to continue to determine vehicle presence 510, and to calculate flow parameters 511. The flow parameters 511 are stored in memory 512 and output 508 over the RS232 serial link to (other) central traffic management systems (not shown), and where desired activate other interface circuits. As may be seen, the binary vehicle presence decision 507 is determined by a user-selected fixed threshold 513.

The invention claimed is:

1. Apparatus for detecting vehicle moving through a predetermined zone, comprising:

(a) a plurality of acoustic-electric transducers trained on said zone;

(b) bandpass filtering means for processing electrical signals from said plurality of acousto-electric transducers;

(c) correlator means having at least two inputs and an output for correlating filtered versions of said electrical signals originating from at least two of said plurality of acousto-electric transducers;

(d) integrator means for integrating the output of said correlator means over time; and (e) comparator means for indicating detection of a vehicle when the integrated output exceeds a predetermined threshold.

2. The apparatus as defined in claim 1, further comprising a plurality of analog-to-digital converter means for converting said electrical signals to digital representations prior to the processing thereof.

3. The apparatus as defined in claim 1, wherein said integrator and said comparator means are each microprocessor-based programs.

4. The apparatus as defined in claim 1, wherein said plurality of acoustic-electric transducers comprises two vertical and two horizontal multiple-microphone elements, and wherein said correlator means has one of said at least two inputs receiving a sum of said two multiple-microphone vertical elements, and the other of said at least two inputs receiving a sum of said two horizontal multiple-microphone elements.

5. The apparatus as defined in claim 2, wherein said plurality of acoustic electric transducers comprises two vertical and two horizontal multiple-microphone elements, and wherein said correlator means has one of said at least two inputs receiving a sum of said two multiple-microphone vertical elements, and the other of said at least two inputs receiving a sum of said two horizontal multiple-microphone elements.

6. The apparatus as defined in claim 3, wherein said plurality of acoustic-electric transducers comprises two vertical and two horizontal multiple-microphone elements, and wherein said correlator means has one of said at least two inputs receiving a sum of said two multiple-microphone vertical elements, and the other of said at least two inputs receiving a sum of said two horizontal multiple-microphone elements.

7. A method for detecting vehicles moving through a predetermined zone, comprising the steps of:

(a) training a plurality of acoustic-electric transducers on said zone;

(b) filtering electrical signals from said plurality of acousto-electric transducers;

(c) correlating at least two of the filtered electrical signals with one another;

(d) integrating the results of correlation in step (c) over time; and (e) comparing the integrated result of step (d) to a predetermined threshold and indicating detection of a vehicle when said threshold is exceeded by the integrated result.

8. The method as defined in claim 7, further comprising the step of converting said electrical signals to digital representations prior to said filtering.

9. The method as defined in claim 8, wherein the steps of integrating and comparing are each computational routines.

10. The method as defined in claim 7, wherein said plurality of acoustic-electric transducers comprises two vertical and two horizontal multiple-microphone elements, and wherein said correlating step continuously correlates the sum of said two vertical multiple-microphone elements with sums of said two horizontal multiple-microphone elements.

11. The method as defined in claim 8, wherein said plurality of acousto-electric transducers comprises two vertical and two horizontal multiple-microphone elements, and wherein said correlating step continuously correlates the sum of said two vertical multiple-microphone elements with sums of said two horizontal multiple-microphone elements.

12. The method as defined in claim 9, wherein said plurality of acoustic-electric transducers comprises two vertical and two horizontal multiple-microphone elements, and wherein said correlating step continuously correlates the sum of said two vertical multiple-microphone elements with sums of said two horizontal multiple-microphone elements.

* * * * *